(12) United States Patent
Zhou et al.

(10) Patent No.: US 9,116,932 B2
(45) Date of Patent: Aug. 25, 2015

(54) SYSTEM AND METHOD OF QUERYING DATA

(75) Inventors: Xiaofan Zhou, Cupertino, CA (US); Andrey Belyy, Sunnyvale, CA (US); Freda Xu, Cupertino, CA (US); Wu Cao, Redwood City, CA (US)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 405 days.

(21) Appl. No.: 13/454,724

(22) Filed: Apr. 24, 2012

(65) Prior Publication Data

US 2013/0282740 A1 Oct. 24, 2013

(51) Int. Cl.
*G06F 17/30* (2006.01)
(52) U.S. Cl.
CPC ............................... *G06F 17/30292* (2013.01)
(58) Field of Classification Search
CPC .................... G06F 17/30321; G06F 17/30619; G06F 17/30557; G06F 17/3056; G06F 17/30563; G06F 17/30566; G06F 17/30569; G06F 17/30292; G06F 17/30327; G06F 17/30625
USPC .................................................. 707/602, 960
See application file for complete search history.

(56) References Cited

U.S. PATENT DOCUMENTS

| | | | |
|---|---|---|---|
| 5,970,490 A * | 10/1999 | Morgenstern | 1/1 |
| 6,738,759 B1 * | 5/2004 | Wheeler et al. | 707/741 |
| 6,741,983 B1 * | 5/2004 | Birdwell et al. | 1/1 |
| 6,795,819 B2 * | 9/2004 | Wheeler et al. | 707/691 |
| 6,965,903 B1 * | 11/2005 | Agarwal et al. | 1/1 |
| 7,546,312 B1 * | 6/2009 | Xu et al. | 1/1 |
| 7,599,947 B1 * | 10/2009 | Tolbert et al. | 1/1 |
| 7,895,568 B1 * | 2/2011 | Goodwin et al. | 717/108 |
| 8,396,827 B2 * | 3/2013 | Gross et al. | 707/602 |
| 2002/0035555 A1 * | 3/2002 | Wheeler et al. | 707/1 |
| 2002/0055932 A1 * | 5/2002 | Wheeler et al. | 707/104.1 |
| 2002/0087516 A1 * | 7/2002 | Cras et al. | 707/2 |
| 2003/0120665 A1 * | 6/2003 | Fox et al. | 707/100 |
| 2004/0167880 A1 * | 8/2004 | Smith | 707/3 |
| 2005/0120051 A1 * | 6/2005 | Danner et al. | 707/104.1 |
| 2005/0149552 A1 * | 7/2005 | Chan et al. | 707/102 |
| 2005/0234889 A1 * | 10/2005 | Fox et al. | 707/3 |
| 2005/0278308 A1 * | 12/2005 | Barstow | 707/3 |
| 2006/0173868 A1 * | 8/2006 | Angele et al. | 707/100 |
| 2009/0083390 A1 * | 3/2009 | Abu-Ghazaleh et al. | 709/209 |
| 2010/0011013 A1 * | 1/2010 | Singh | 707/101 |
| 2010/0299517 A1 * | 11/2010 | Jukic et al. | 713/150 |
| 2011/0035391 A1 * | 2/2011 | Werner et al. | 707/756 |
| 2011/0231454 A1 * | 9/2011 | Mack | 707/803 |
| 2012/0011097 A1 * | 1/2012 | Matsumura et al. | 707/606 |
| 2012/0215768 A1 * | 8/2012 | Zellweger | 707/722 |

(Continued)

OTHER PUBLICATIONS

Michael Benedikt, Christoph Koch, "XPath Leashed," ACM Comput.Surveys, vol. 41, No. 1, Article 3, Dec. 2008.

(Continued)

*Primary Examiner* — James Trujillo
*Assistant Examiner* — Hubert Cheung
(74) *Attorney, Agent, or Firm* — Fountainhead Law Group PC (57) ABSTRACT

A system and method of querying data. The method includes transforming first data according to a unified data model. The unified data model has a hierarchical structure with tree nodes and leaf nodes. A leaf node contains a table. The method further includes executing a unified data model query on the first data (having been transformed) to result in second data. The method further includes outputting the second data.

20 Claims, 5 Drawing Sheets

(56) References Cited

U.S. PATENT DOCUMENTS

2012/0303645 A1* 11/2012 Kulkarni-Puranik ......... 707/756
2013/0290338 A1* 10/2013 Lee et al. ...................... 707/739

OTHER PUBLICATIONS

Daniel Brandon, Jr., "Recursive Database Structures," Journal of Comput. Small Coll., vol. 21, Issue 2, pp. 295-304. Dec. 2005.

E.F. Codd, "A Relational Model of data for Large Shared Data Banks," Communications of the ACM, vol. 13, No. 6, pp. 377-387. Jun. 1970.

Denise Draper, Alon Y. Halevy, Daniel S. Weld, The Nimble XML Data Integration System, Data Engineering, Proceedings of the 17th International Conf., pp. 155-160. 2001.

CS145 Lecture Notes (14)—Recursion in SQL. see http://infolab.stanford.edu/~ullman/fcdb/jw-notes06/recursion.html printed on Apr. 24, 2012.

Jayavel Shanmugasundaram, Kristin Tufte, Gang He, Chun Zhang, David DeWitt, Jeffrey Naughton, "Relational Databases for Querying XML Documents: Limitations and Opportunities", Proceedings of the 25th VLDB Conference, Edinburgh, Scotland, 1999.

* cited by examiner

FIG. 1

| firstName | lastName | street | city | state | zip | email | cell |
|---|---|---|---|---|---|---|---|
| | | | | | | | |

Person 200

FIG. 2

```
Persons
    └── person (*)                    300
                ├── Name
                ├── Address
                │       ├── street
                │       ├── city
                │       ├── state
                │       └── zip
                └── Contact
                        ├── email
                        └── cell
```

FIG. 3

```
Persons                        400
{
    person
    {select
            firstName||lastName as Name,
            Address {street, city, state, zip},
            Contact {email, cell}
    from Person
    }
}
```

FIG. 4

```
CatalogS                                    CatalogT
└── book (*)              502                └── author (*)           504
     ├── name                                      ├── name
     ├── price                                     ├── contact
     ├── copiesSold                                │    ├── email
     └── author (*)                                │    └── cell
          ├── firstName                            └── book (*)
          ├── lastName                                  ├── name
          ├── email                                    └── totalSale
          └── cell
```

FIG. 5

```
CatalogT
{
        author                                                              600
        {select
                CatalogS.book.author.firstName || CatalogS.book.author.lastName as Name,
                Contact {CatalogS.book.author.email as email, CatalogS.book.author.cell as cell},
                book
                {select
                        CatalogS.book.name as name
                        CatalogS.book.price * CatalogS.book.copiesSold as totalSale
                from CatalogS.book Cross_Join CatalogS.book.author
                where book.author.firstName|| CatalogS.book.author.lastName
                        =CatalogT.author.name
                }
        from CatalogS.book Cross_Join CatalogS.book.author
        distinct CatalogT.author.name
        }
}
```

SYSTEM AND METHOD OF QUERYING DATA

CROSS REFERENCE TO RELATED APPLICATIONS

Not applicable.

BACKGROUND

1. Technical Field

The present disclosure relates to data processing, and in particular, to data structures.

2. Description of the Related Art

Unless otherwise indicated herein, the approaches described in this section are not prior art to the claims in this application and are not admitted to be prior art by inclusion in this section.

There are a few well known and commonly used data models for structured and semi-structured data; among them are the relational data model and the hierarchical data model. The relational data model forms the basis for modern database technology, and SQL (structured query language) query language is developed and standardized to retrieve/update information stored in the database. Built upon the relational data model and the SQL query language, various ETL (extraction, transformation and loading) tools are developed to transform and integrate data stored in different database systems or flat file formats. On the other hand, databases based on hierarchical data model were popular before relational databases were introduced and hierarchical data structures like IDOC (intermediate document) and EDI (electronic data interchange) have been broadly used to exchange and integrate information among heterogeneous application systems. Today, with the wide acceptance of XML (extensible markup language) technologies and others like JSON (JavaScript object notation) in the internet and cloud computing environment, the hierarchical data model is becoming more and more important. Data transformation and integration tools like SQL/XML (XML extension to the SQL), XQuery and XSLT (extensible stylesheet language transformations) are also developed.

SUMMARY

The disparate efforts and developments for different data formats, as described above, often result in co-existence of a hybrid of highly complicated and inefficient software systems in the enterprise IT (information technology) environment. An embodiment is directed toward a unified mechanism for the relational data and the hierarchical data so that the same technologies in relational data model and SQL query language can be applied to the hierarchical data model. An embodiment also implements a process to use SQL-like languages to query and transform hierarchical data.

One embodiment is a method of querying data. The method includes transforming first data according to a unified data model. The unified data model has a hierarchical structure with tree nodes and leaf nodes. A leaf node contains a table. The method further includes executing a unified data model query on the first data (having been transformed) to result in second data. The method further includes outputting the second data. In this manner, queries may be written without regard for the underlying persistent storage of the first data (hierarchical, relational, etc.).

A computer system may operate to implement the method described above. The computer system may store, execute or be otherwise controlled by one or more computer programs that control the computer system to implement the method described above.

A non-transitory computer readable medium may store instructions to control a computer system to perform the method described above. The instructions may include a transforming component, a processing component, and an output component.

The following detailed description and accompanying drawings provide a better understanding of the nature and advantages of the present disclosure.

DETAILED DESCRIPTION

Described herein are techniques for transforming and querying data. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

In this document, the terms "unified data model" and "unified data model query" are used. In general, the unified data model refers to the data model described below, which is neither just a relational data model nor just a hierarchical data model, but includes features of both. Similarly, the unified data model query refers not merely to a general query as would be applicable to querying a relational data model or a hierarchical data model, but to the specific query described below that is operable with the unified data model.

As mentioned above, an embodiment implements a unified data model that includes features of both relational data models and hierarchical data models. Before describing the unified data model, the features of both relational data models and hierarchical data models are described.

Relational Data Models

In the relational data model, the basic data structures are a table and a row. A table is a collection (data set) of information items. It is organized in a model of horizontal rows and vertical columns. Each row in the table contains the same number of columns with the same data type in the same column. It is important to notice that each column in a row can only contain scalar values; that is, a row is a flat structure. As can be seen, a table has two unique characteristics:

It is a collection of a repeatable item, that is, the row.
The repeatable item (the row) is a flat structure that contains a list of scalar values.

In implementation, a database system based on the relational data model normally consists of a set of base tables. On top of that, a view can be derived from one or more base tables or other views, but in essence, a view is still a table, that is, a collection of repeatable flat rows. The process of deriving information from one or more tables is called "query". In the standardized SQL query language, a query is usually performed with the declarative SELECT statement with optional keywords and clauses like FROM, WHERE, ORDER BY, and GROUP BY, et cetera.

When a "query" is made from more than one table, join operations must be used. A join operation takes two data sets (tables) and produce one result set (a table or a view) based on a certain criteria among columns of the rows from these source data sets. There are different types of join operations. ANSI (American National Standards Institute) standard SQL specifies four types of JOINs: INNER, OUTER, LEFT, and RIGHT.

In enterprise IT environment like data warehousing, often time data from diverse sources co-exist and there is a need to integrate them and load to various data targets. ETL (extract, transform and load) tools are developed to perform this task. Based upon the relational data model and the technologies in the SQL query language, these tools can perform very well if the data is flat, but are usually inefficient in handling hierarchical data for the simple reason that hierarchical data is not arranged in relational manner (tables and rows), hence some ad hoc conversions between these two data models are often needed.

Hierarchical Data Model

The hierarchical data model has a few basic characteristics:
The data is organized in a tree like structure using a parent-child relationship in which a parent node can have one or more child nodes and a child node can have only one parent node (one-to-many relationship).
Some nodes in the tree structure can be repeatable, which means that in the instance document it is a collection of a repeatable item (instance), but the repeatable item itself is often hierarchical.

Depending on different hierarchical data formats (XML, IDOC or EDI, et cetera), the content model can be somewhat different. For example, an element (or node) in an XML document can also have one or more attributes besides one or more child elements. Also in XML, one can define the content mode of a given element as a sequence, a choice or an all of a list of other child elements. However, no matter how different the content models are, the basic characteristics of a hierarchical data structure stay the same.

Various query languages for hierarchical data retrieval and transformation have been developed. Some are open standard based while others are proprietary. For example, SQL/XML, or XML-related Specifications is an extension to the SQL specification, which defines the use of XML in conjunction of SQL. XSLT is another language for transforming XML documents into other XML documents. One more example, XQuery is a functional programming language that is designed to query XML data for transforming or combining documents and web pages, et cetera. These query languages and many of the implementations achieve reasonable degree of success with the hierarchical data. However, there exist some noticeable weaknesses:

They either are unable to process relational data or fail to match the performance of database engines or ETL tools when the data is flat.
These query languages usually are heavily associated with specific hierarchical data formats. For example, XSLT and XQuery are both designed for XML data and rely on XPath, which utilizes some concepts like namespace that do not even exist in other formats like EDI, for traversing the input documents. They also produce output only in XML format. So these languages cannot be applied directly to other hierarchical data formats like EDI, IDoc and other proprietary application data.

A Unified Data Model for Both Relational and Hierarchical Data

While the hierarchical data model is very different from the relational data model, the unified data model identifies the similarity between the two models. We first observe the following in the hierarchical data:

Hierarchical data is a collection of instances and sub instances that are arranged in a parent-child relationship.

We define an instance as an occurrence of a repeatable structure (e.g. a repeatable element in an XML schema) in the actual document.

Figure 1:
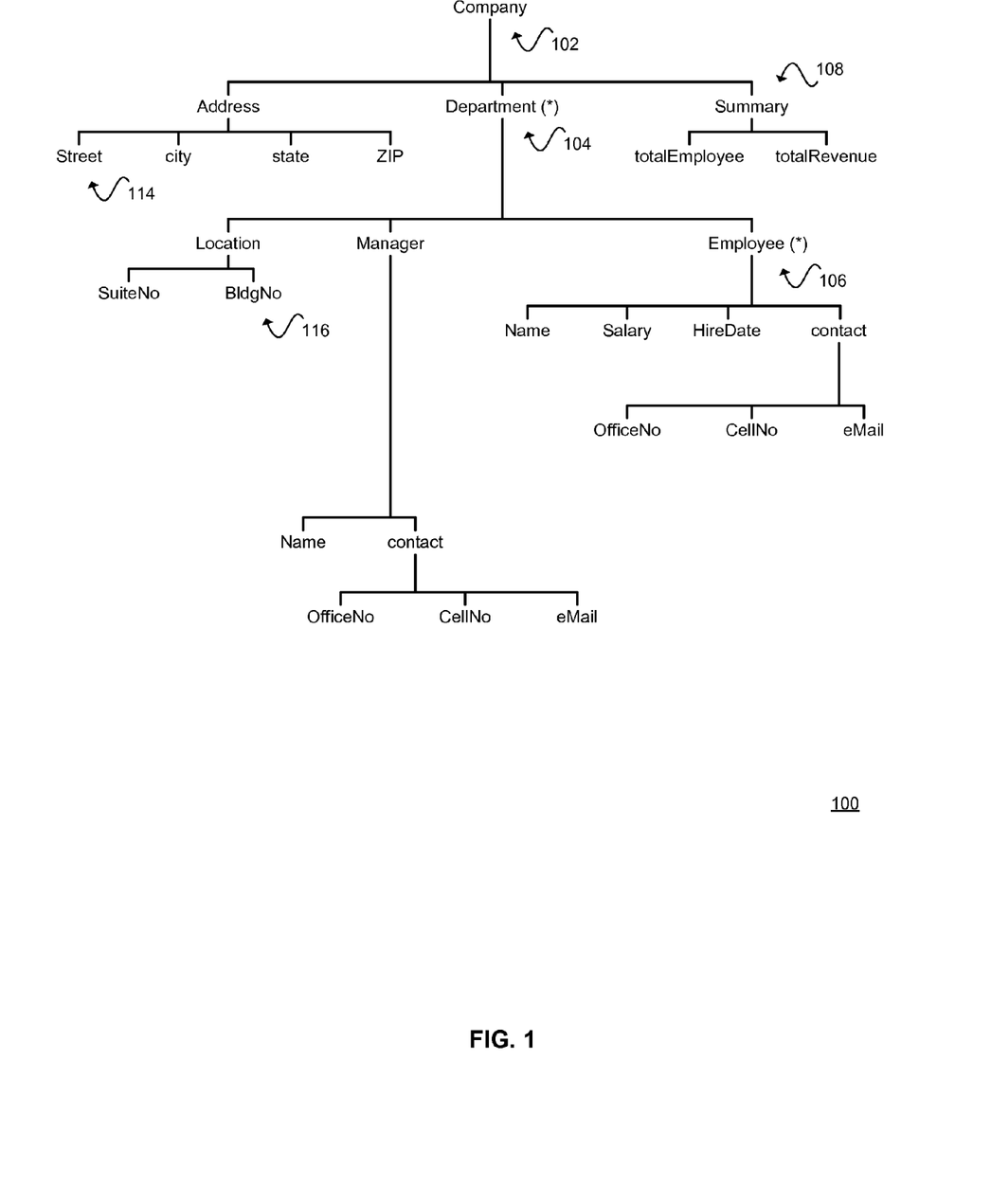
FIG. 1 shows a hierarchical structure that represents a simplified hierarchical structure of a company.

FIG. 1 shows a hierarchical structure 100 that represents a simplified hierarchical structure of a company. The hierarchical structure 100 includes a root node 102, a number of leaf nodes (114, 116 and others unnumbered; corresponding to the end points of the hierarchical structure 100), and a number of non-leaf nodes (104, 106, 108 and others unnumbered; corresponding to the other headings in the hierarchical structure 100 that are not end points).

The root node 102 represents an instance of the root schema "Company", which in the actual document is the entire document. That is, the root schema of a document always has only one instance.
An instance of the schema "Department" includes the entire structure under the node 104 "Department" and it is a sub instance of the instance "Company". Since the node 104 "Department" is repeatable (denoted by the asterisk (*)), a "Company" instance might contain multiple sub instances of the schema "Department". Similarly, a "Department" instance might contain multiple sub instances of the schema "Employee" (node 106).

We further observe the following:

First, for a given instance, leaving out the repeatable sub instances, a full path from the root 102 to a leaf node (e.g., node 116) is sufficient to access the value of the leaf node (e.g., the building number of that Department).

In the hierarchical structure 100, the path Company.Address.Street will retrieve the street name for a given company (node 114). The path Company.Department.Location.BidgNo will retrieve the building number of a given "Department" (node 116). And so on and so forth.

We recognize that this is very similar to a row in a table where a column name of a given "Department" is sufficient to retrieve the column value.

Second, the non-repeatable nodes inside the hierarchical data structure (so they are non-leaf nodes without asterisks, e.g. node 108) are only important in presenting the content data held in the leaf nodes.

In other words, the non-repeatable nodes inside the structure 100 are there only to create a structure; that is, if we collapse those non-repeatable nodes and leave out the repeatable ones, an instance essentially becomes a flat row but contain the same content. Or we can say this:

An instance of a hierarchical structure is very much like a flat row. The paths from the root to the leaf nodes of the instance uniquely identified the content in the leaf nodes.

Third, a repeatable node in the hierarchical data model can be modeled as a table. The only difference is that instead of containing a list of flat rows, now it contains a list of instances.

Finally, we realize that a table schema is the simplest form of a repeatable schema for a hierarchical data structure, and accordingly a row is the simplest form of an instance.

Based on these observations, an embodiment implements a unified model for the relational data and the hierarchical data. This data model uses only two constructs: table and instance. It has the following basic characteristics:

A table is a collection of repeatable item, that is, instance.
When a table is part of a hierarchical structure, the reference to a table is the fully qualified path from the root to the repeatable node that represents the table.
An instance is a hierarchical structure in nature. A row in a table is the simplest form of an instance.
Within an instance, the path from the root to a leaf node is sufficient to retrieve the value of that leaf node.
Within an instance, the non-leaf nodes are only important in presenting the content data in a structural view.
A leaf node in an instance can contain not only scalar value but also another table, that is, it can be a repeatable node. We say the table of which this instance is a member and the table associated with this leaf node has a parent-child relationship.
Within an instance, leaf nodes are the only nodes that can be repeatable.

It is easy to see that this data model fully covers the relational data model because a row is the simplest form of an instance. It also covers the hierarchical data model because an instance by nature is a hierarchical structure and it can contain other child repeatable structures on the leaf nodes.

Relational Join Operations and the Iteration Rule

Relational join operations are thoroughly studied and well established in the relational data model as described in Relational Algebra or Relational Calculus. As we have already briefly introduced in the section for relational data model, a join is essentially an operator that takes two data sets (tables) as operands and produces one data set (a table or a view) as the result by checking to see if certain condition is met. Notice that this is a logical data set. It does not have to be physically created. In an actual query, the final result set (the target set) is created by iterating through this data set. We call the way to create this logical data set the iteration rule. The simplest iteration rule is just one input table. When two or more input tables are involved, a join or multi-way joins are needed.

With the unified data model, when two tables do not have a parent-child relationship, the same relational join operations can still be applied as they are being used in the relational data model, only that now a member in a source data set (table) is an instance rather than a flat row (but an instance can be just a flat row). Also, in order to retrieve the scalar value of a node in an instance, now we need to use a fully qualified path instead of just the column name, although the path might be just the column name if the table contains only flat rows.

When two tables have a parent-child relationship in a hierarchical structure, relational join operations should not be applied. This is because in a hierarchical structure, the instances of the child table are inherently grouped into the parent table; that is, each instance of the parent table contains a list of instances of the child table and these child instances are guaranteed to be its true children. However, in order to retrieve scalar values in an instance of the child table, the system must know which instance in the parent table and then which instance of the child table with the parent instance. This means that the system may create a data set of instances in which the instance of the parent table contains exactly one instance of the child table. For example, in the hierarchical structure 100 of FIG. 1, if we want to get a list of employee name and his/her manager name, the system iterates through each "Department" and for each "Department" iterates through each employee. This is like doing a Cartesian product of the parent and child tables to produce a data set of instances in which each instance contains one particular "Department" and particular "Employee". But this Cartesian product of two parent-child tables is slightly different from the original definition of Cartesian product of two relational tables. Using the same example, in the relational data model you would have two tables, one for "Department" and another for "Employee". A Cartesian product of these two tables would produce a data set in which "Department" and "Employee" do not match in some records.

Query Hierarchical Data Using SQL

Based on the unified data model we now propose a process to query hierarchical data using SQL. There are a few considerations:

First, the query should generally present its result as a hierarchical structure.
Further, the query itself need not concern about how the result is to be presented or serialized in the target destination; that is, whether the final format is in XML, JSON, or EDI et cetera is not a problem here. It is the concern of the receiver of the query result. This way, the system implements a query language that is able to query any data format and load to any other data format. For example, the query result may be output in the unified data model format, in hierarchical format, in relational format, etc.

To present a SQL query result in a hierarchical query is easy with the unified data model. Because in this model, we know that an instance with a hierarchical structure and a flat row can have a one to one relationship between the leaf nodes in the instance and the columns in the flat row. This means that the system can insert non-repeatable nodes to create a structure from a flat row and at the same time contain the same content.

Figure 2:
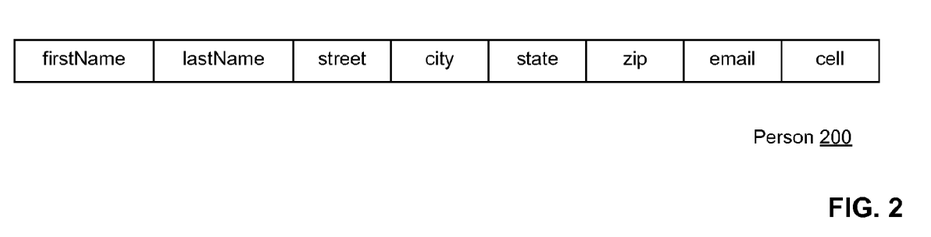
FIG. 2 shows a table named Person having eight columns.

FIG. 2 is a table 200 named Person having eight columns. The following SQL command may be used to select all the columns in the table:

Select * from Person

Figure 3:
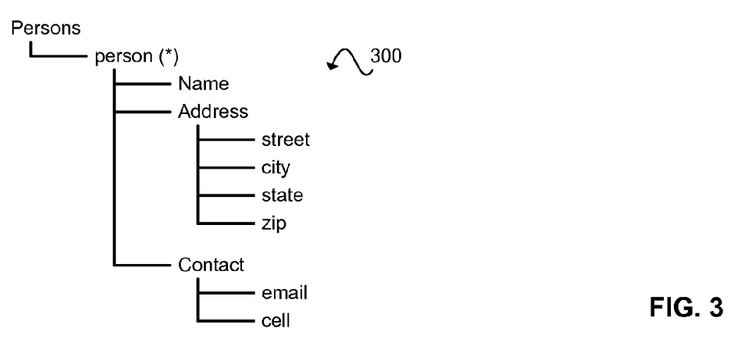
FIG. 3 shows a hierarchical structure.

What we want is a structure like the hierarchical structure 300 shown in FIG. 3.

Figure 4:
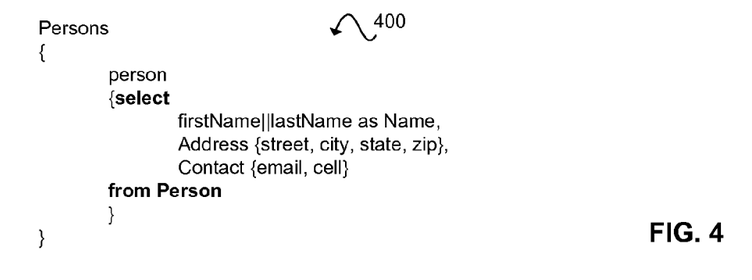
FIG. 4 shows a unified data model query command.

To achieve this, we will use the unified data model query command 400 shown in FIG. 4.

This command will return all the columns for all the persons in the table Person, which is what the above SQL command returns. However, this command presents the result in a hierarchical way.

In this command, a few rules are followed:

- A pair of curly brackets { } is used to enclose the content of a node.
- Inside the pair of curly brackets is a list of child item for the enclosing node.
- A repeatable node in the structure (a table) is associated with a SQL select statement. In this example, the node "person" has a Select statement.
- The selected list of columns in the SQL select statement can be wrapped into a structure where none of the nodes is repeatable.
- Non repeatable nodes are only important in presenting the content. They are there to create a structure. This means that they can be added at will to create a desired structure.

Figure 5:
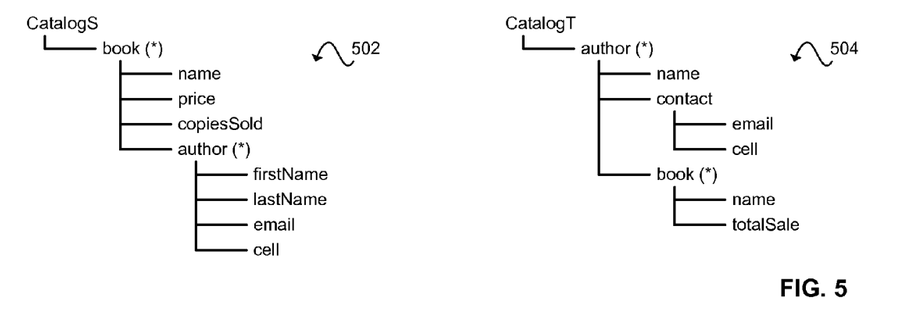
FIG. 5 shows a source structure and a target structure.
Figure 6:
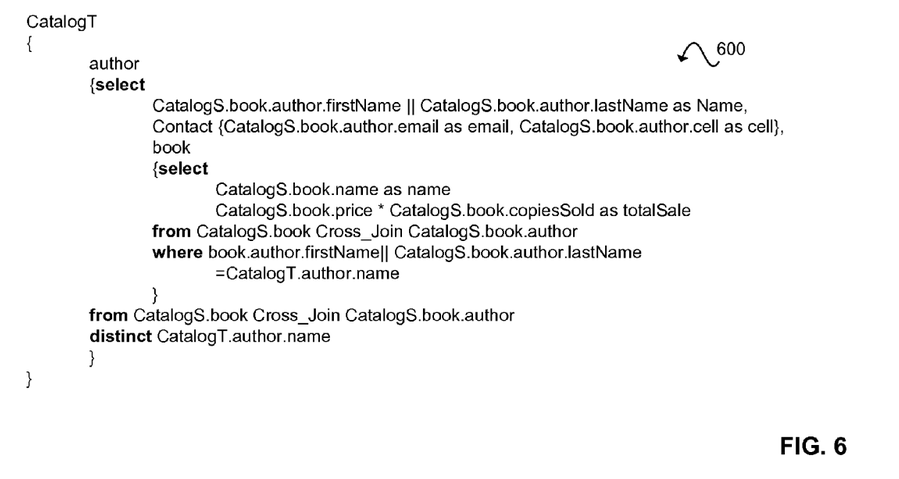
FIG. 6 shows a unified data model query command.

We now look at another example. In this example, we have a catalog containing a list of books, and in each book, there are one or more authors. The goal of a query is to create a catalog containing list of authors and for each author a list of his books. The source structure 502 and target structure 504 are shown in FIG. 5. The unified data model query 600 is shown in FIG. 6.

In this example, besides following the same rules as described previously, we have one more rule:

- A repeatable node (a table) can appear as an item in a selection list. However, this node itself must use a select statement to create its content.

Also in this example, we make two extensions to the SQL language:

- In the DISTINCT clause, we specified one target column CatalogT.author.name as the distinct criteria. This is different from the Standard SQL DISTINCT. In SQL, the DISTINCT is performed on entire selection list in the result set. This is not desired in this case, because what we needed in this case is a unique list of authors and checking the author name is sufficient to create the list.
- In the second select statement, there is a "where" clause. In this where clause, we also use the target column CatalogT.authro.name. This is to create a book list that belongs to the specified author. This usage is fine because the target table "book" is a child item of the target table "author"; when the system evaluates the select statement for the book, the system already knows the author for which to create the list.

SUMMARY

In this application, we described a unified data model that covers both the relational data model and hierarchical data model. We also set forth a process to query data represented in this data model using SQL-like grammars. We made two extensions to the SQL standard to facilitate the query. A computer system according to an embodiment implements an engine to query data in any structured (or semi-structured format) and to present the result in any other format.

The unified data model fits all hierarchical data yet the queries don't depend on the specific format of the hierarchical data for the following reasons. First, any hierarchical data format can be represented in this model. Various Readers may be used to render different hierarchical data in this model. Second, hierarchical data represented in this model can be formatted into any concrete data format with proper FORMATTER (or Loader/Writer). An embodiment of the system currently supports XML and IDOC.

With this addition to the existing superior capability to handle relational data, the system implements a data service engine not only for ETL but also for message exchanges and System/Application integrations and aggregations, yet users only need to learn one platform.

Figure 7:
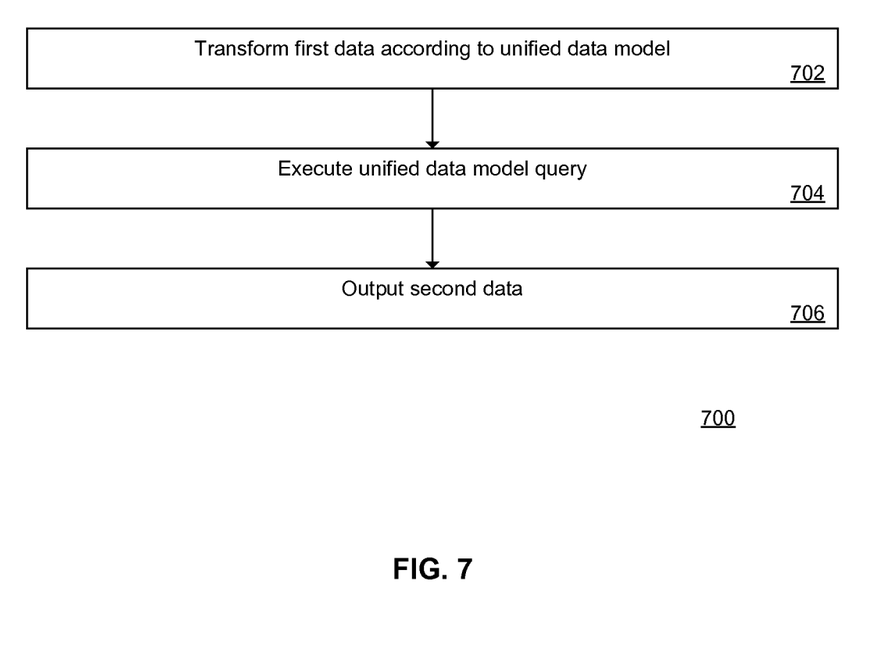
FIG. 7 is a flowchart of a method of outputting data using the unified data model and the unified data model query.

FIG. 7 is a flowchart of a method 700 of outputting data using the unified data model and the unified data model query described above. The method 700 may be performed by a computer system, for example as controlled by one or more computer programs that the computer system stores and executes.

At 702, first data is transformed according to a unified data model. The unified data model has a hierarchical structure with a plurality of tree nodes and a plurality of leaf nodes. A leaf node of the plurality of leaf nodes contains a table. Thus, the unified data model corresponds neither to a relational data model nor to a hierarchical data model, but has features of both.

More specifically, the first data may be stored persistently in a hierarchical format or in a relational format. The system then reads the first data and transforms it according to the unified data model, e.g. storing it as an in-memory representation of the first data in a unified data model structure. For example, the catalog information (see FIG. 5) may be considered to be the first data; the transformed first data then refers to the catalog information transformed according to the source structure 502. A transforming component of the computer program may control the computer system to implement step 702.

At 704, a unified data model query is executed on the transformed first data to result in second data. For example, the unified data model query 600 (see FIG. 6) is executed on the catalog information in the source structure 502 (see FIG. 5) to result in the catalog information in the target structure 504. A processing component of the computer program may control the computer system to implement step 704.

At 706, the second data is output. An output component of the computer program may control the computer system to implement step 706.

Figure 8:
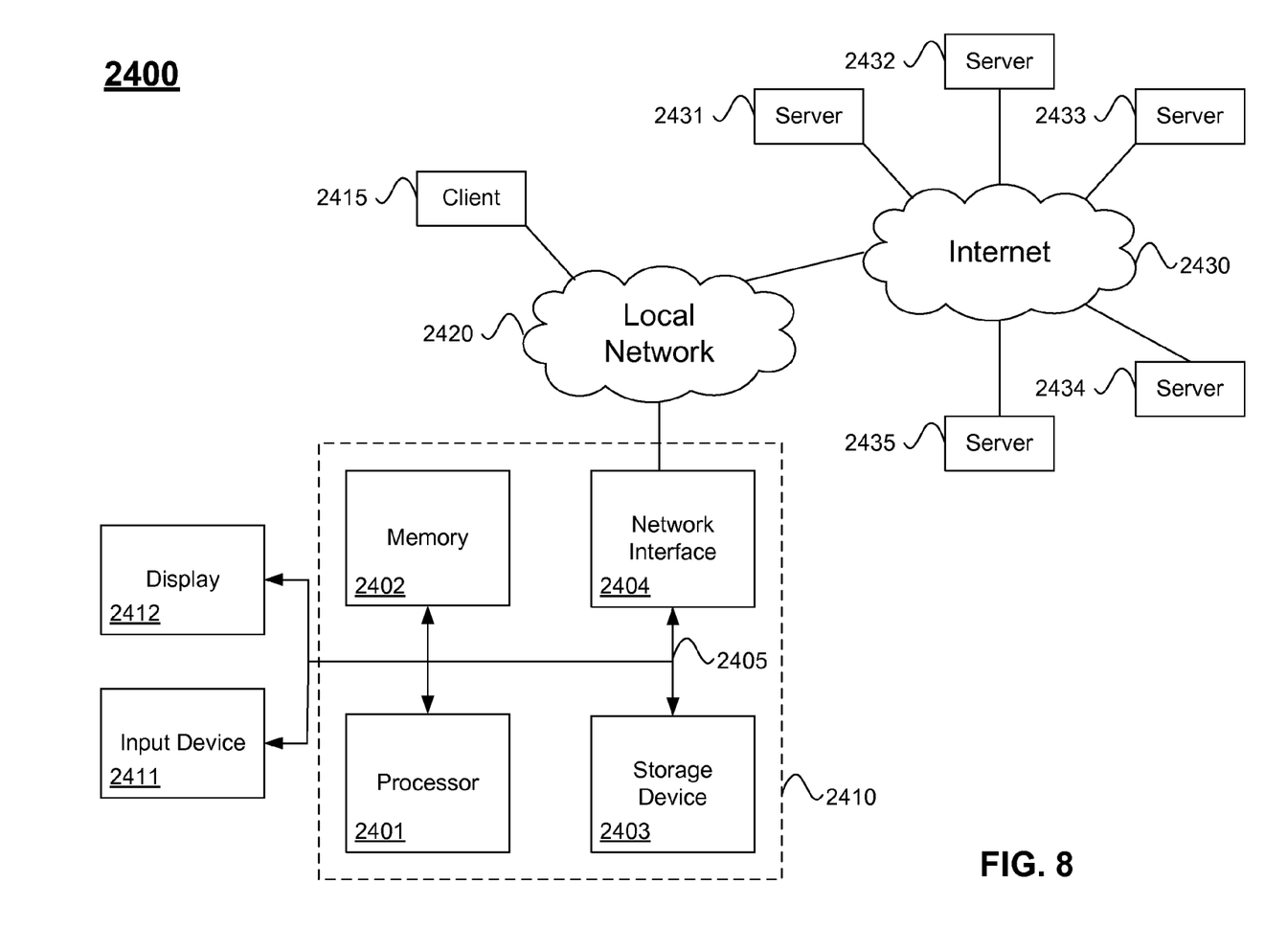
FIG. 8 is a block diagram of an example computer system and network for implementing embodiments of the unified data model and the unified data model query.

FIG. 8 is a block diagram of an example computer system and network 2400 for implementing embodiments of the present disclosure. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM) (when not storing temporary variables or other intermediate information), or both. A storage device 2403 is also provided for storing information and instructions. Common forms of storage devices include, for example, a hard drive, a magnetic disk, an optical disk, a CD-ROM, a DVD, a flash memory, a USB memory card, a solid state drive, or any other medium from which a computer can read. Storage device 2403 may store source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, as described above, the server 2431 may store first data according to its format (hierarchical, relational, etc.). The computer system 2410 may transform the first data according to the unified data model, may execute a unified data model query on the transformed first data, and may output the resulting second data on the display 2412. Alternatively the computer system 2410 may output the second data to the server 2432 for storage.

The above description illustrates various embodiments along with examples of how aspects of the present invention may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method of outputting data, comprising:
storing, by a computer system, first data in a first format, wherein the first format is one of a hierarchical format and a relational format;
transforming, by the computer system, the first data from the first format to a second format, wherein the second format is neither the hierarchical format nor the relational format, wherein the second format is a source structure according to a unified data model, wherein the unified data model has a hierarchical structure with a plurality of tree nodes and a plurality of leaf nodes, and wherein a leaf node of the plurality of leaf nodes contains a table, wherein the table includes at least a portion of the first data;
storing, by the computer system, the first data structured in the source structure;
executing, by the computer system, a unified data model query on the first data having been transformed into the source structure, to result in second data structured in a target structure according to the unified data model, wherein executing the unified data model query comprises:
creating the target structure as a second plurality of tree nodes and a second plurality of leaf nodes, wherein each of the second plurality of leaf nodes are repeatable, wherein each of the second plurality of tree nodes are not repeatable, and wherein the target structure differs from the source structure,
computing a result of the unified data model query, wherein the result includes a second table that is based on at least a portion of the first data, and
containing the second table in a second leaf node of the second plurality of leaf nodes, wherein the second leaf node differs from the leaf node that contains the table in the source structure; and
outputting, by the computer system, the second data structured in the target structure.

2. The method of claim 1, wherein the table includes a plurality of instances.

3. The method of claim 1, wherein the table includes a plurality of instances, wherein an instance is a repeatable item.

4. The method of claim 1, wherein the table has a reference corresponding to a fully qualified path from a root node to a repeatable node, wherein the repeatable node represents the table.

5. The method of claim 1, wherein the unified data model query includes an extension that specifies a target column as a distinct criteria.

6. The method of claim 1, wherein the unified data model query includes an extension that specifies a target column in a where clause of a select statement.

7. The method of claim 1, wherein the unified data model query includes a first extension that specifies a target column as a distinct criteria, and a second extension that specifies a target column in a where clause of a select statement.

8. The method of claim 1, wherein the second data is output in a unified data model format.

9. The method of claim 1, wherein the second data is output in a hierarchical format.

10. The method of claim 1, wherein the second data is output in a relational format.

11. A computer system for outputting data, comprising:
a storage device that is configured to store first data in a first format, wherein the first format is one of a hierarchical format and a relational format; and
a processor that is configured to control the computer system to transform first data from the first format to a second format, wherein the second format is neither the hierarchical format nor the relational format, wherein the second format is a source structure according to a unified data model, wherein the unified data model has a hierarchical structure with a plurality of tree nodes and a plurality of leaf nodes, and wherein a leaf node of the plurality of leaf nodes contains a table, wherein the table includes at least a portion of the first data, wherein the storage device is configured to store the first data structured in the source structure, wherein the processor is configured to control the computer system to execute a unified data model query on the first data having been transformed into the source structure, to result in second data structured in a target structure according to the unified data model, wherein executing the unified data model query comprises:

creating the target structure as a second plurality of tree nodes and a second plurality of leaf nodes, wherein each of the second plurality of leaf nodes are repeatable, wherein each of the second plurality of tree nodes are not repeatable, and wherein the target structure differs from the source structure, computing a result of the unified data model query, wherein the result includes a second table that is based on at least a portion of the first data, and containing the second table in a second leaf node of the second plurality of leaf nodes, wherein the second leaf node differs from the leaf node that contains the table in the source structure, and wherein the processor is configured to control the computer system to output the second data structured in the target structure.

12. The system of claim 11, wherein the table includes a plurality of instances.

13. The system of claim 11, wherein the table includes a plurality of instances, wherein an instance is a repeatable item.

14. The system of claim 11, wherein the table has a reference corresponding to a fully qualified path from a root node to a repeatable node, wherein the repeatable node represents the table.

15. The system of claim 11, wherein the unified data model query includes an extension that specifies a target column as a distinct criteria.

16. The system of claim 11, wherein the unified data model query includes an extension that specifies a target column in a where clause of a select statement.

17. A non-transitory computer readable medium storing instructions to control a computer system for outputting data, comprising:

a storing component that is configured to control the computer system to store first data in a first format, wherein the first format is one of a hierarchical format and a relational format;

a transforming component that is configured to control the computer system to transform the first data from the first format to a second format, wherein the second format is neither the hierarchical format nor the relational format, wherein the second format is a source structure according to a unified data model, wherein the unified data model has a hierarchical structure with a plurality of tree nodes and a plurality of leaf nodes, and wherein a leaf node of the plurality of leaf nodes contains a table, wherein the table includes at least a portion of the first data, wherein the storage device is configured to store the first data structured in the source structure, a processing component that is configured to control the computer system to execute a unified data model query on the first data having been transformed into the source structure, to result in second data structured in a target structure according to the unified data model, wherein executing the unified data model query comprises:

creating the target structure as a second plurality of tree nodes and a second plurality of leaf nodes, wherein each of the second plurality of leaf nodes are repeatable, wherein each of the second plurality of tree nodes are not repeatable, and wherein the target structure differs from the source structure, computing a result of the unified data model query, wherein the result includes a second table that is based on at least a portion of the first data, and containing the second table in a second leaf node of the second plurality of leaf nodes, wherein the second leaf node differs from the leaf node that contains the table in the source structure; and an output component that is configured to control the computer system to output the second data structured in the target structure.

18. The non-transitory computer readable medium of claim 17, wherein the table includes a plurality of instances.

19. The non-transitory computer readable medium of claim 17, wherein the table includes a plurality of instances, wherein an instance is a repeatable item.

20. The non-transitory computer readable medium of claim 17, wherein the table has a reference corresponding to a fully qualified path from a root node to a repeatable node, wherein the repeatable node represents the table.

* * * * *